Feb. 26, 1952 — A. MONTALI — 2,587,366
SPINNING FISH LURE
Filed May 11, 1950
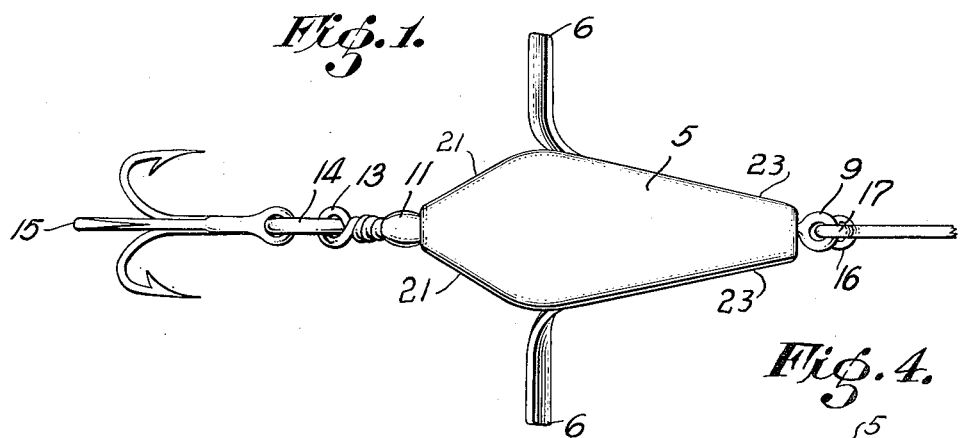
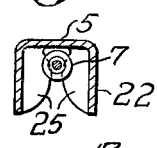
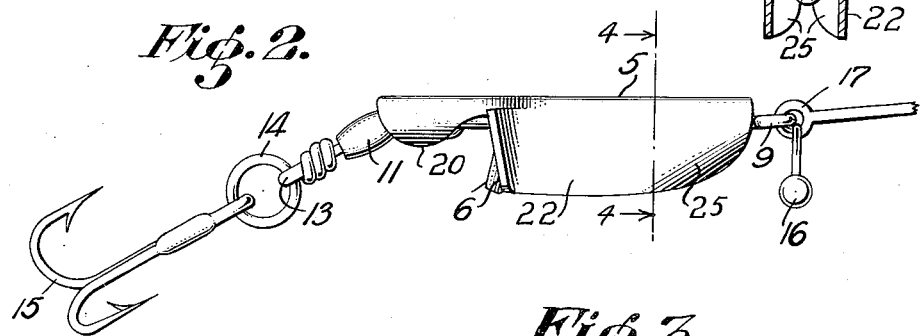
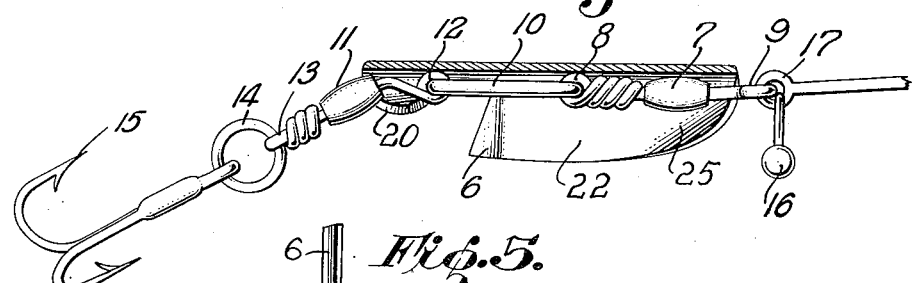
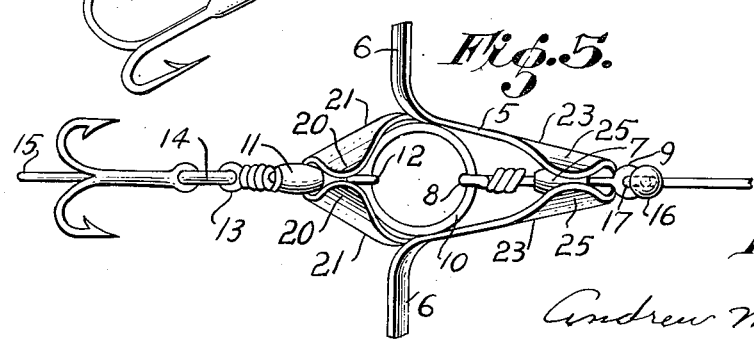
Inventor:
Andrew Montali Patented Feb. 26, 1952

2,587,366

UNITED STATES PATENT OFFICE 2,587,366

SPINNING FISH LURE

Andrew Montali, Avonmore, Pa.

Application May 11, 1950, Serial No. 161,453

4 Claims. (Cl. 43—42.16)

This invention relates to spinning fishing lures.

It is a general object of the present invention to provide a novel and improved spinning and fishing lure of extreme simplicity of construction and one which is particularly effective in its unusual and erratic operation in catching fish.

More particularly it is an object of the invention to provide a spinning fishing lure in the form of a generally hollow four sided body formed about a connection between a fishing line and one or more hooks, in which the body construction is of bent sheet metal of unitary form closed on one face and open on the opposite face and equipped with pitched blades or fins serving to cause rotation on relative movement of the lure and the water.

One of the important features of the invention comprises the one-piece bent sheet metal body adapted to be mounted over a simple connecting system, preferably a pair of tandem mounted swivels arranged between a fishing line and suitably sized gang of hooks, in which the metal body is generally four sided unsymmetrical only about the transverse axis and having fins on the extensions of this axis.

Other and further features and objects of the invention will be more apparent to those skilled in the art upon a consideration of the accompanying drawing and following specification, wherein is disclosed a single exemplary embodiment of the invention, with the understanding that such modifications may be made therein as fall within the scope of the appended claims without departing from the spirit of the invention.

In said drawings:

Fig. 1 is a top plan view of the lure;

Fig. 2 is a side elevation thereof;

Fig. 3 is a view similar to Fig. 2 with the housing shown in longitudinal cross-section;

Fig. 4 is a transverse section on line 4—4 of Fig. 2; and

Fig. 5 is a bottom plan view of the body portion of the lure shown on a smaller scale.

The lure of the present invention is intended for casting, spinning or trolling for such game fish as lake trout, bass and the like, and comprises a body rotatable on relative movement through the water and mounted for spinning on a connecting element between the fishing line and a suitable gang of hooks.

Referring now to the drawings, the terminal of the fishing line is shown at 17 secured through the front eyelet 9 of a more or less standard swivel 7 whose rear eyelet 8 is connected by a suitable link member, such as a large ring 10, to the front eyelet 12 of a second swivel 11 whose rear eyelet 13 supports a ring or other attaching device 14 for a hook gang 15 or any other elements intended to be used with the lure. As shown the line portion 17 is part of a leader structure having a rear eye to which may be looped the supporting arm of a weight 16 serving the purpose of maintaining the line against rotation and determining its depth of operation.

The tandem mounted swivels forming the connection between the line and the hook gang are at least partially enclosed by a hollow sheet metal body 5 forming the spinning portion of the lure. Preferably this is formed from metal, of suitable gauge, and includes a main wall portion generally four sided and symmetrical about its longitudinal or spinning axis and non-symmetrical about its transverse axis. The under face of this wall lies against the swivel 8, link 10 and at least the forward eye of swivel 11 and is loosely held in position thereon by tab portions, integral with the four sided wall, which are formed over and engage the connecting elements. Thus there are small tabs 20 extending from the short edges 21 of the wall, which are bent over fairly close to the under surface thereof to loosely engage with the rear swivel so that the forward portion thereof as well as the link 10 is caused to rotate with the spinner body. The hook being behind swivel 11 remains stationary.

A somewhat similar mode of attachment of the other end of the main wall is achieved by use of elongated tabs 22 of almost uniform width, which extend from the long straight edges 23 of the wall and are substantially normal to the plane thereof over most of their length, as seen in Figs. 2 and 4. The converging tab ends of these are curved inwardly at 25 to engage about the swivel 7 just forward of its main portion. These, plus the rear tabs 20, hold the body in place on the connection assembly between the line and hooks to permit it to rotate in respect to these two by virtue of the swivels. The tabs 22 are longer than the edges 23 of the four sided wall and their free ends are bent to project substantially parallel to the transverse axis thereof to form fins 6. Each is given a twist or pitch so as to form a small propeller to produce the spinning action on relative movement between the lure and the water. The degree of pitch determines the rate of rotation and may be readily adjusted by bending with a tool such as plyers.

As viewed in Fig. 5 the under face of the body is largely open, exposing the ring 10 and portions of the swivels and presenting a hollow compartment of peculiar outline with irregular edges presented to the water.

I claim:

1. A spinning fish lure comprising a pair of swivels each having eyelets, means connecting adjacent eyelets of the swivels, a connector for attaching a hook to the free eyelet of one swivel, the free eyelet of the other swivel providing for line attachment, a body member of sheet material comprising an elongated generally four sided main wall having its major axis extending over said swivels, and having integral tabs, extending from each edge of said main wall and partially curved back over it to engage about the swivels and hold them against the main wall, said tabs being shaped and sized to expose a portion of the underside of said main wall, the tabs from a pair of corresponding edges having fins integral therewith, said fins extending laterally from the main wall along the minor axis thereof and being pitched to provide for spinning the same.

2. The lure defined in claim 1 in which the body member is unsymmetrical about the transverse axis of the four sided main wall providing long and short edges thereon and in which the tabs extending from the long edges have the fins extending therefrom at the widest portion of the main wall, said last mentioned tabs having their maximum overlap with the main wall at the narrow end portion thereof.

3. A sheet metal body member and swivelling and connecting means for use between a fishing line and a hook connector, said body member comprising a metal sheet main wall defining a flat generally four sided area symmetrical about its longitudinal axis and unsymmetrical about its transverse axis and providing long and short edges, a tab extending integrally from each short edge of the wall about the swivelling connecting means near the adjacent end of the wall, an elongated tab extending integrally from each long edge of the wall substantially normal to the plane thereof and having a tab portion adjacent the junction of the elongated tabs with the main wall curved about the connecting means, the opposite end portion of each elongated tab being curved to extend substantially parallel to and substantially coextensive with said transverse axis and pitched to spin the body when moved relative to the water.

4. The device as defined in claim 3 in which the under side of the four sided wall is exposed between the said tabs.

ANDREW MONTALI.

REFERENCES CITED

The following references are of record in the file of this patent:

UNITED STATES PATENTS

| Number | Name | Date |
|---|---|---|
| 1,419,540 | Brown | June 13, 1922 |
| 1,530,343 | Bayer | Mar. 17, 1925 |
| 1,566,812 | Bayer | Dec. 22, 1925 |
| 1,620,972 | Hobbs | Mar. 15, 1927 |
| 1,873,577 | Grove | Aug. 23, 1932 |
| 2,494,407 | Rhodes | Jan. 10, 1950 |